United States Patent
Su

[11] Patent Number: 6,053,514
[45] Date of Patent: Apr. 25, 2000

[54] PUSH CART

[76] Inventor: Chung-Shiu Su, No. 3, Lane 565, Da Sheh Rd., Lu-Chu Shiang, Kaohsiung Hsien, Taiwan

[21] Appl. No.: 09/141,413

[22] Filed: Aug. 27, 1998

[51] Int. Cl.[7] .................................................. B62B 1/20
[52] U.S. Cl. ........................................ 280/40; 280/47.315
[58] Field of Search ............................... 280/638, 35, 38, 280/39, 40, 641, 645, 646, 651, 652, 654, 655, 655.1, 47.17, 47.18, 47.24, 47.27, 47.29, 47.315

[56] References Cited

U.S. PATENT DOCUMENTS

| | | | |
|---|---|---|---|
| 3,659,867 | 5/1972 | Curry | 280/40 |
| 4,315,632 | 2/1982 | Taylor | 280/40 |
| 4,917,392 | 4/1990 | Ambasz | 280/40 |
| 5,348,325 | 9/1994 | Abrams | 280/40 |
| 5,468,005 | 11/1995 | Yang | 280/40 |
| 5,803,471 | 9/1998 | DeMars et al. | 280/40 |
| 5,984,327 | 11/1999 | Hsieh et al. | 280/47.24 |

*Primary Examiner*—Lanna Mai
*Assistant Examiner*—Andrew J. Fischer
*Attorney, Agent, or Firm*—Rosenberg, Klein & Lee

[57] ABSTRACT

A push cart comprises a main frame, a handle, a front support, two wheel frames, two wheels, a retractable rod and a rear support, wherein the main frame has a pair of side rods connected with a pair of rods of the handle in a slidable manner, the center portion of the main frame is connected to each other, and the lower portion of the main frame has connected with a wheel frame and a wheel respectively. The lower respective ends of the main frame are connected with respective ends of the front support which then meshes with the wheel frame. The respective lower ends of the handle are connected with one end of the retractable rod whereas the other end of the retractable rod is connected with the inner center portion of the front support, thus, by operating the handle, the retractable rod is linked to move which then links the front support and the wheel frame to retract or to expand.

6 Claims, 9 Drawing Sheets

PUSH CART

FIELD OF THE INVENTION

This invention relates to a push cart, and more particularly, to a cart which can be operated by the handle to retract or to expand a front support and a wheel frame.

BACKGROUND OF THE INVENTION

In order to produce a compact easy to carry push cart, various carts are made in compact size, by folding each parts of a cart, however, such design still possesses many defects. Later, a compact push cart was developed which comprises a handle that is foldable against the supporting rod and to link wheels to collapse inwardly or to expand inwardly, however, the support will still be needed to operate manually.

OBJECT OF THE INVENTION

This is the primary object of the present invention to provide a push cart which is easy to operate.

It is another object of the present invention to provide a push cart which structure is more solid and more compact.

It is a further object of the present invention to provide a push cart which is less expensive to produce.

DETAILED DESCRIPTION OF THE PREFERRED EMBODIMENT

Figure 1:
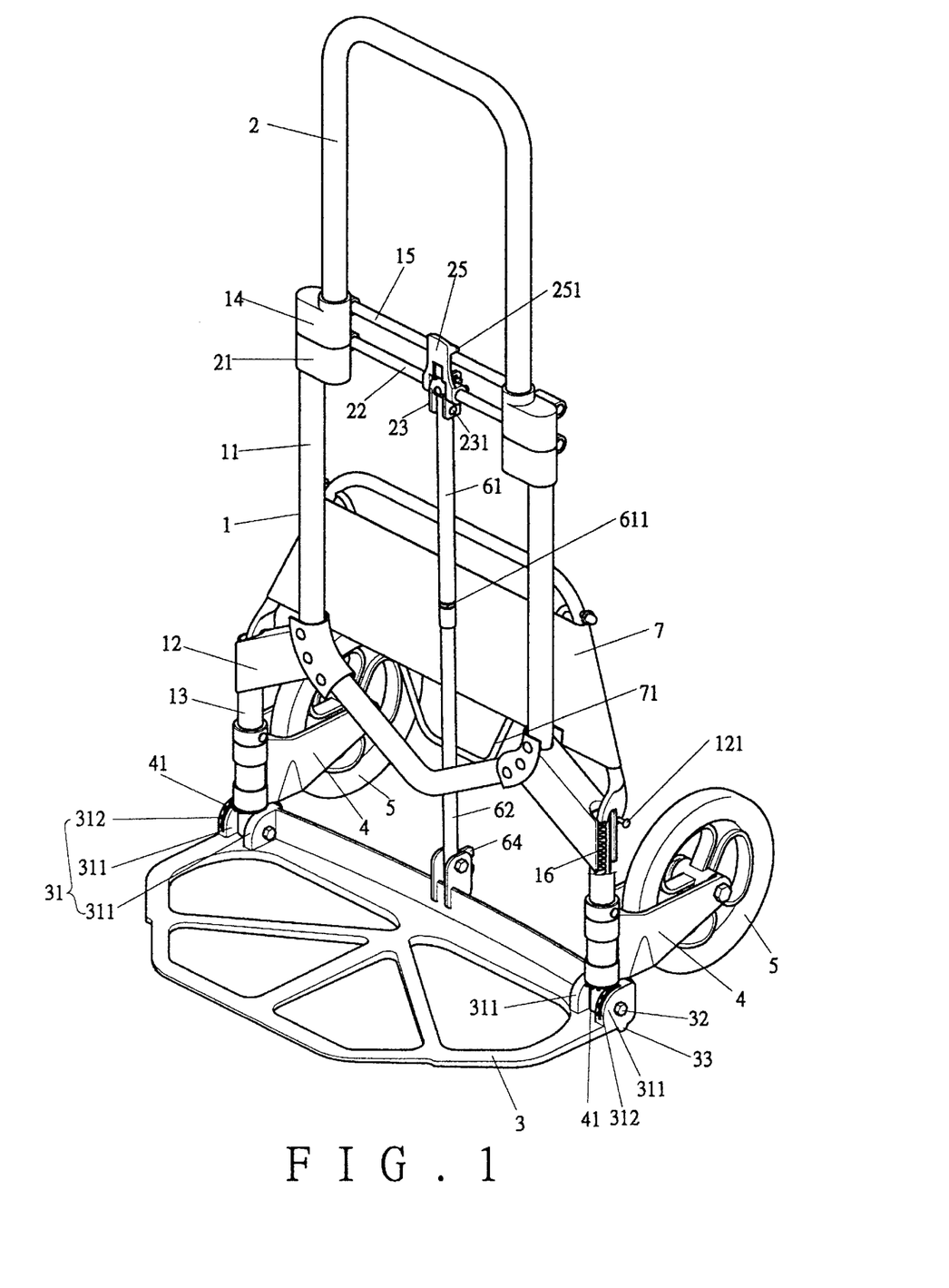
FIG. 1 is a perspective view of the present invention.

Referring to FIG. 1, a push cart of the present invention comprises a main frame 1, a handle 2, a front support 3, two wheel frames 4, two wheels 5, a retractable rod 6 and a rear support 7. The interconnected relations are such that, the main frame 1 has its upper respective sides slidably connected with the lower respective sides of the handle 2, the middle portion of the main frame 1 is connected with the respective sides of the rear support 7 while the lower portion of the main frame 1 is connected to the wheel frame 4 which then connected with a pair of wheels 5. The respective lowermost ends of the main frame 1 are connected with the respective ends of the front support 3 which then meshes with the wheel frame 4. The center portion of the handle 2 is connected with one end of the retractable rod 6 which has its other end connected to the inner center portion of the front support 3. By operating the handle 2, the retractable rod 6 is linked to retract or to expand the front support 3 and the wheel frame 4.

The main frame 1 comprises a U-shaped rod 11, two fixtures 12, two supporting rods 13, two sockets 14, a cross bar 15 and a pulling spring 16. The lower ends of the U-shaped rod 11 are connected with one end of each fixture 12, the other ends of the fixtures 12 are secured with the supporting rods 13, respectively. Each supporting rods 13 has a pulling ring 16 which connects to a pin 121, the U-shaped rod 11 has a pair of sockets 14 being connected to a cross bar 15 at its respective ends.

Figure 2:
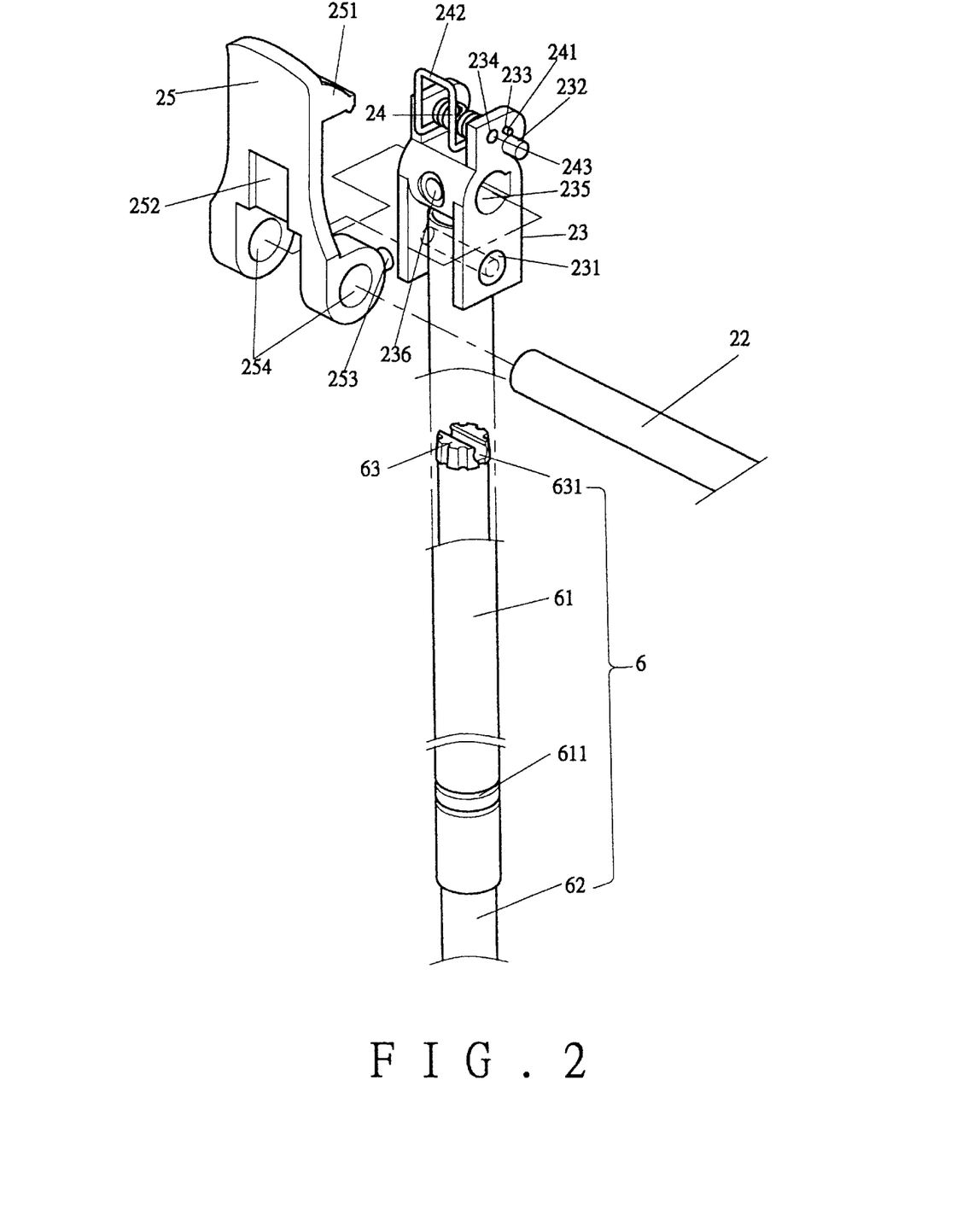
FIG. 2 is an enlarged view of a snap plate of the present invention.
Figure 3:
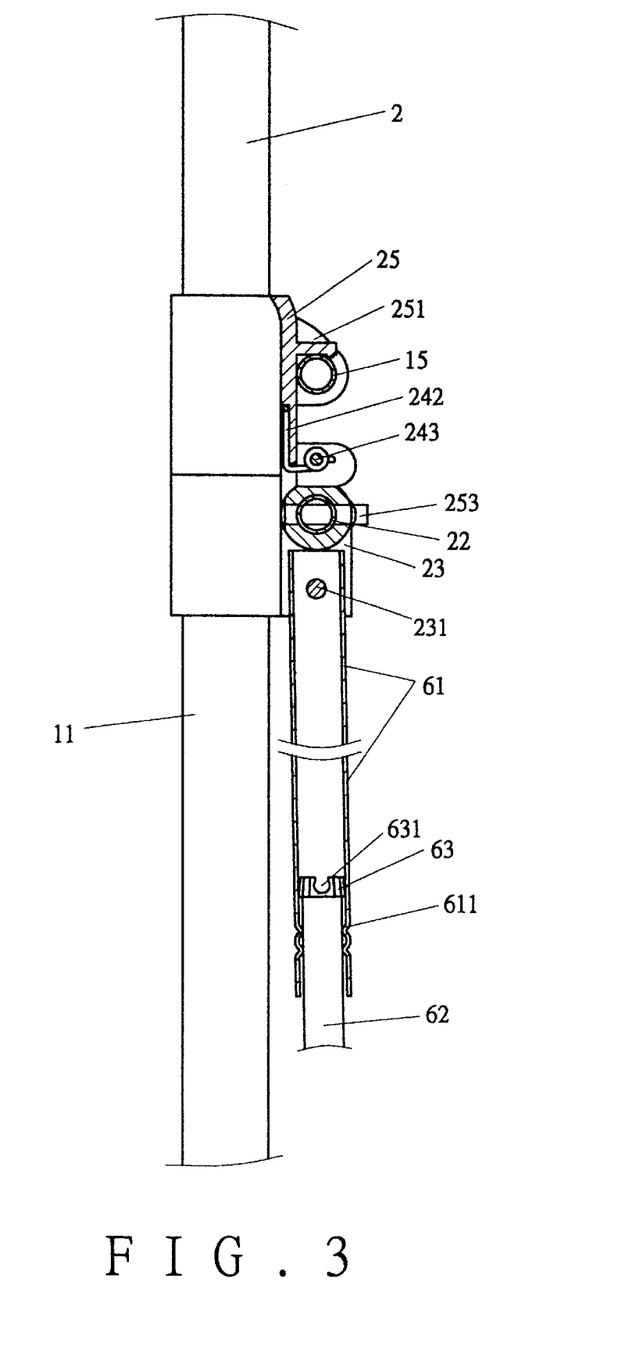
FIG. 3 is a view similar to FIG. 2 in operation.

The handle 2 is a reversed U-shaped comprises two sliding seats 21, a cross bar 22, a lock 23, a torque spring 24 and a snap plate 25. The handle 2 is inserted at its two ends to the socket 14 of the main frame 1 and secured with two sliding seats 21 which are also inserted through the U-shaped rod 11 so that the main frame 1 and the handle 2 are slidable against each other. The two sliding seats 21 are interconnected by a cross bar 22 which includes a lock 23 at center, as shown in FIGS. 2 and 3. The lock 23 includes a tube 235 in horizontal position having extending upwardly and downwardly, a pair of plate from respective ends, the downward end plate of the tube 235 has a through hole (not marked) and is secured to the upper portion of an outer tube 61 of the retractable rod 6 by a fixed pin 231, the upper plates of the tube 235 have formed with a stopper 232 and two holes 233 and 234, the torque spring 24 is formed with spiral coil and a pair of bars 241 extending from respective sides thereof and a reversed U-shaped snap ring 242 at center of the rod 241, the snap plate 25 has a slope surface 251 at its top portion and a recess 252 at the rear end thereof, the snap plate 25 comprises a hole 254 at the respective lower sides, and a stopper 253 at the front position, the torque 24 is connected to the lock 23 by inserting a pin 241 through the hole 233, and a pin 243 through hole 234 and the center of the torque spring 24, the snap plate 25 is buckled to the tube 235 of the lock 23 by the cross bar 22 with the snap ring 242 of the torque spring 24 seat in the recess 252 of the snap plate 25, whereas the stopper 232 and 253 will block each other when the snap plate 25 is pushed rearwardly to a predetermined angle.

The front support 3 is a plate form having a pair of hinges 31 extending upwardly from the respective ends, each hinge 31 is formed by two horizontal plates 311 which are inserted by the lower end of the supporting rod 13 of the main frame 1 and secured by a pin 32 therein. Each hinge 31 has a plate 311 having formed with teeth 312, and the front support 3 has a rib 33 at its bottom portion for the convenience of operating the cart when fully loaded.

The wheel frame 4 has connected to the wheel 5 and is connected to the lower end of the supporting rod 13, the wheel frame 4 has also teeth 41 corresponding to and meshes with the teeth 312, by the meshing of the teeth 312 and 41, when the front support 3 is making horizontal or vertical movement, the wheel frame 4 can be turned left or right in a horizontal direction.

The retractable rod 6 includes an outer tube 61, an inner tube 62, a stopper 63 and a C-snap ring 64, whereas the inner tube 62 is slidably inserted in the outer tube 61 and has formed a stopper 63 at the top portion, the stopper 63 has a larger outer diameter than the outer diameter of the inner tube 62 but smaller than the inner diameter of the outer tube 61, a C-shaped groove 631 is formed on the top of the stopper 63, and the outer tube 61 has an inwardly bulge portion 611 and a C-snap ring 64 at the lower end which is connected to the center front portion of the front support 3.

The rear support 7 is a plate having connected with a locating bar 71 which center portion will be clipped by the C-snap ring 64, the respective sides of the rear support 7 are secured to the pin 121 of the fixture 12, and the pulling spring 16 has one end secured to the rear support 7, whereas the other end of the pulling spring 16 is secured to the supporting rod 13 which lower end is secured by the pin 32 so that a retract force is applied on the rear support 7.

Figure 4:
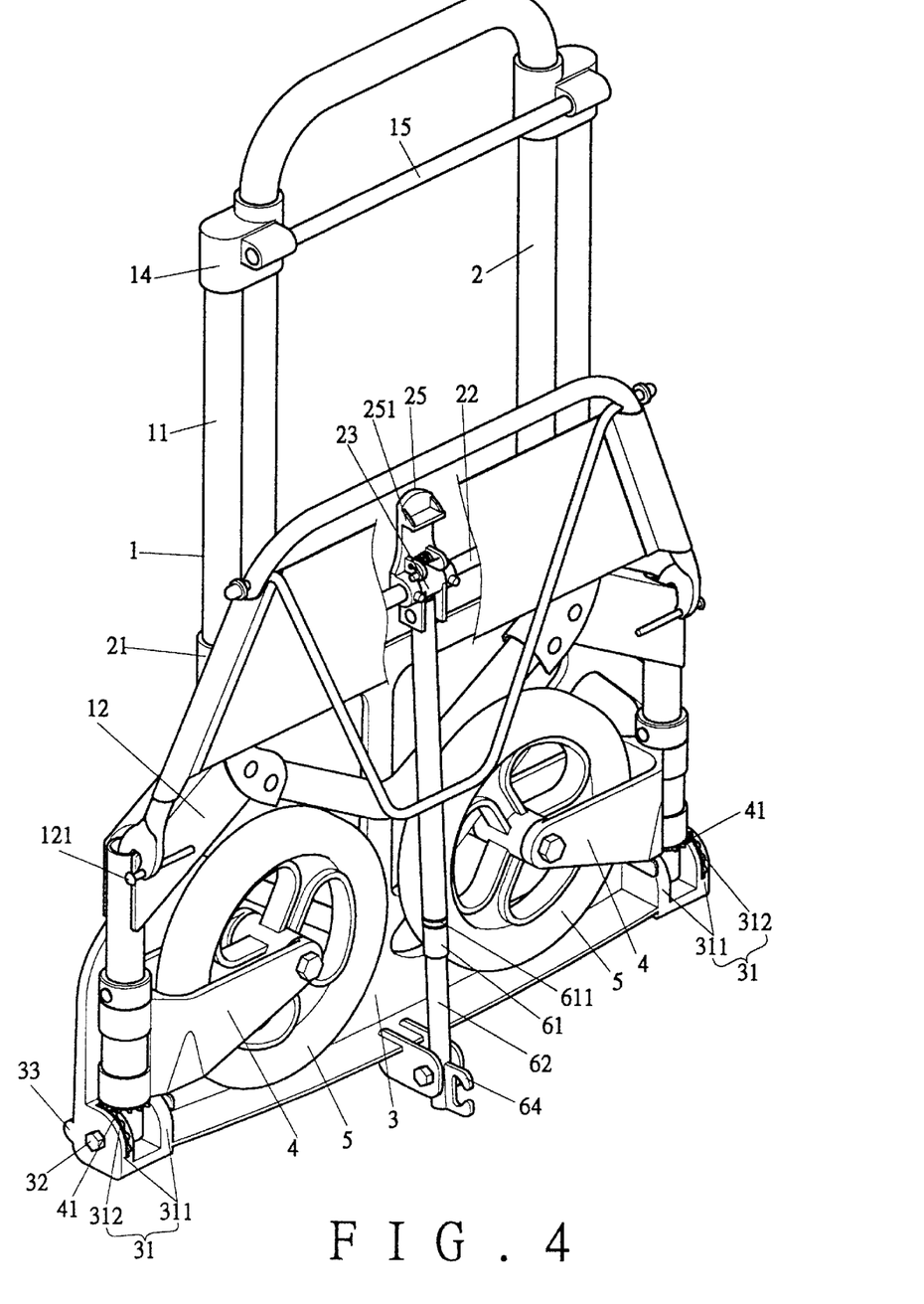
FIG. 4 is a perspective view of the present invention in a folded status.
Figure 5:
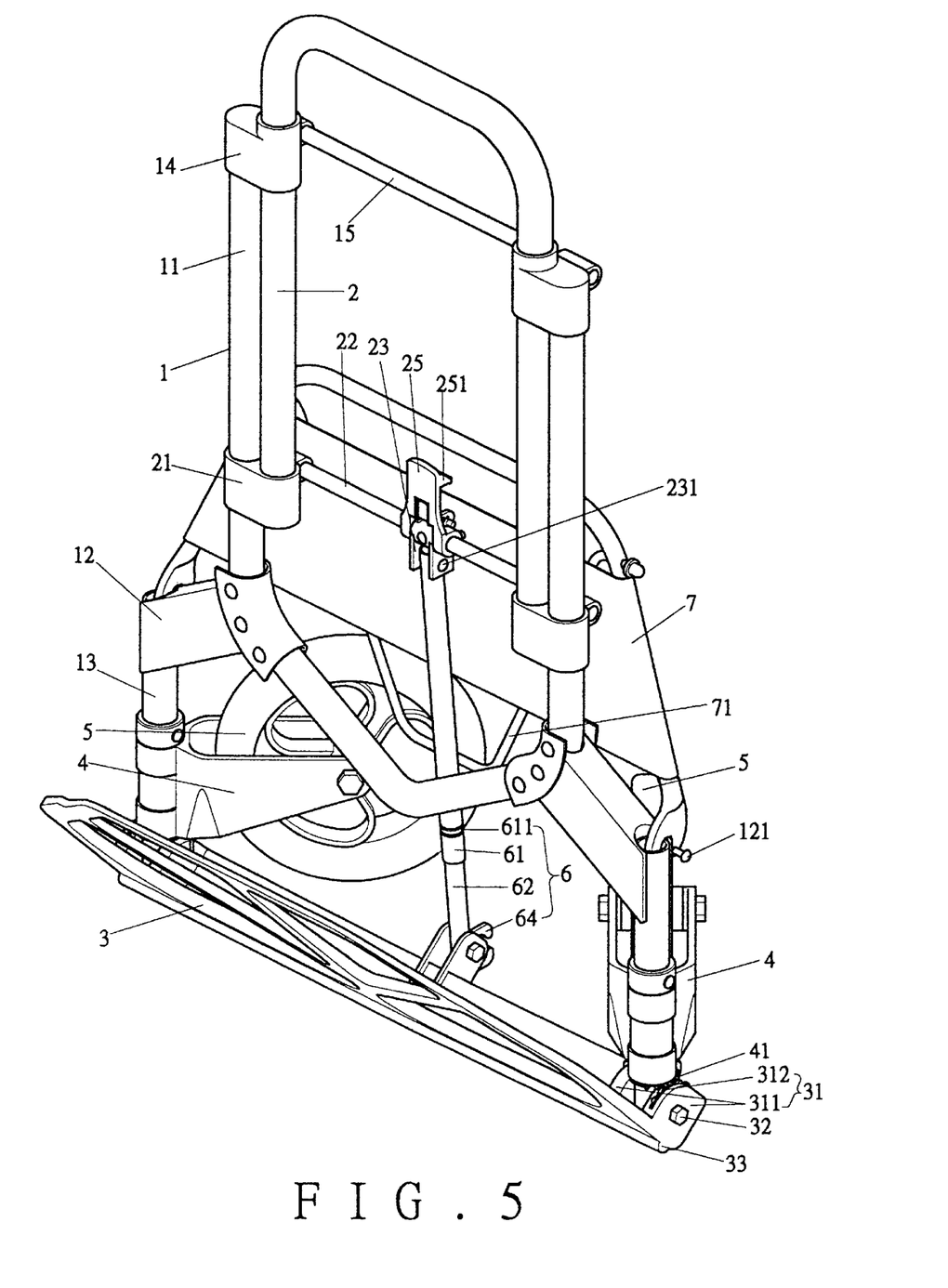
FIG. 5 is a perspective view similar to FIG. 4 with a support in opening status.

To operate the present invention, as shown in FIGS. 4 and 5, push the handle 2 towards the main frame 1 to retract the length, when the retracting has reached a certain degree, the outer tube 61 and the inner tube 62 will retract simultaneously, upon the groove 631 of the stopper 63 of the inner tube 62 reaches the pin 231 of the lock 23, a further pushing force will activate the retractable rod 6 to link the front support 3 to turn, whereas the teeth 312 of the hinge 31 mesh with the teeth 41 that links the wheel frame 4 to retract and return into the main frame 1.

Figure 6:
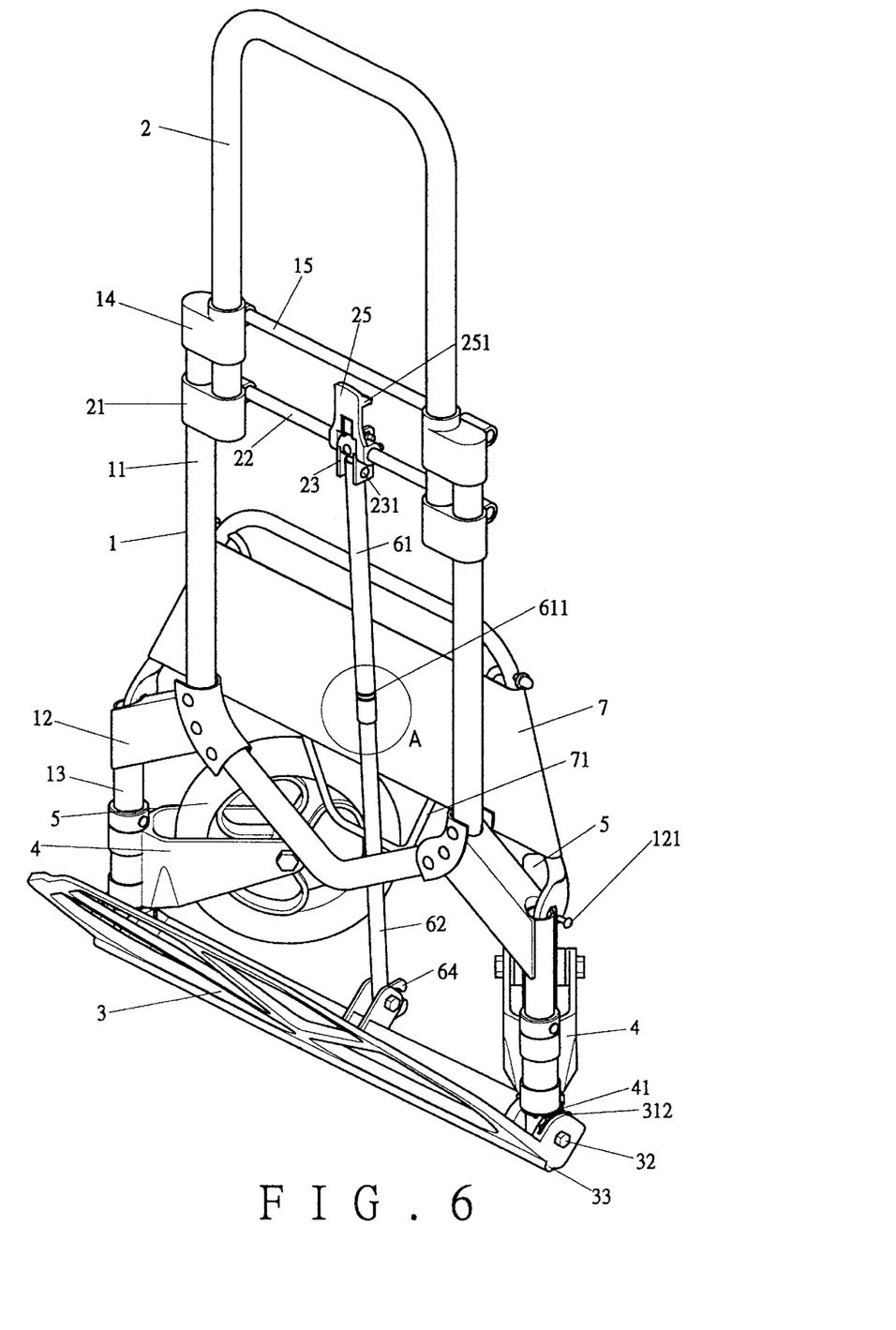
FIG. 6 is a perspective view of the present invention in partially operating status.
Figure 7:
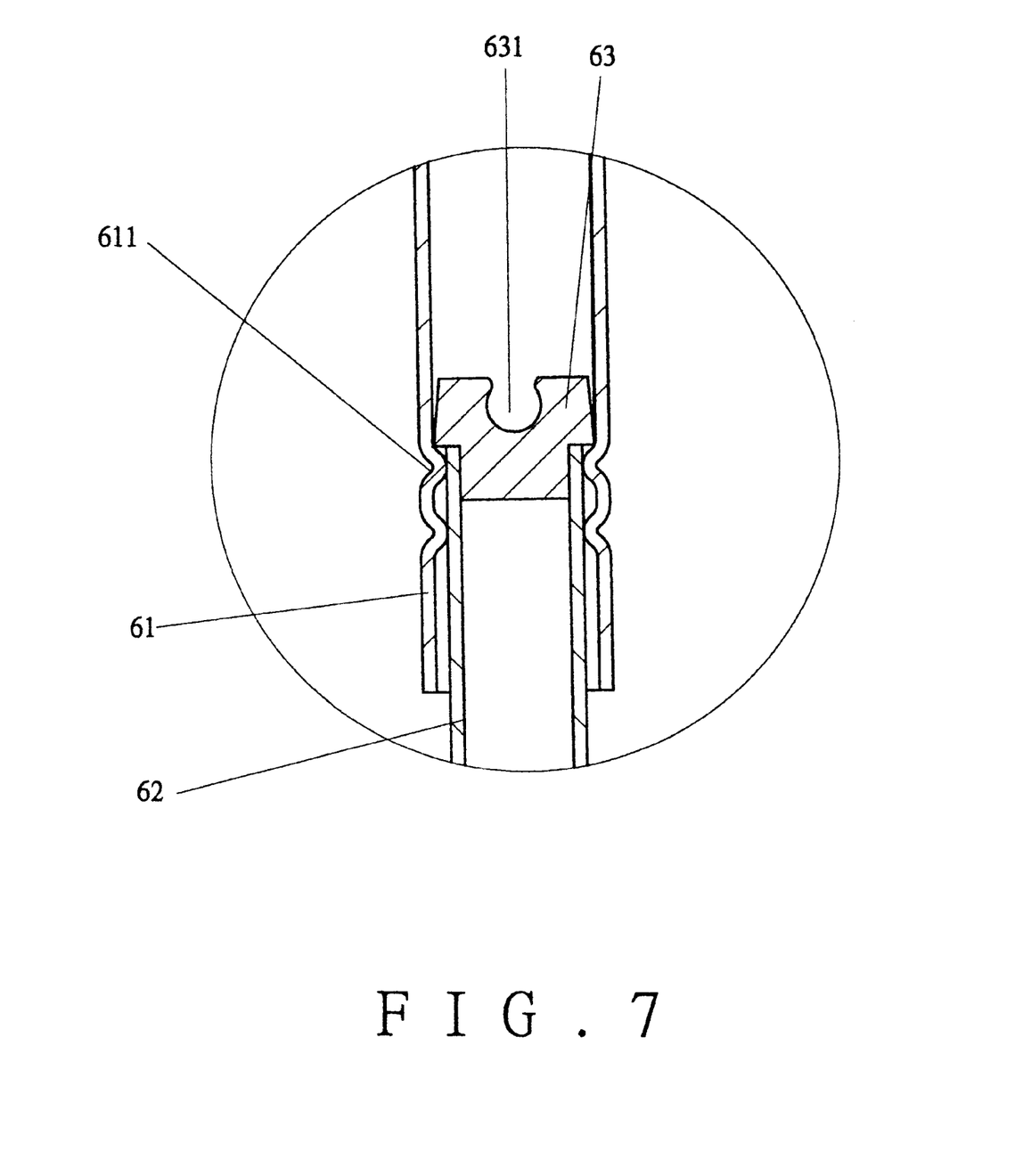
FIG. 7 is a is an enlarged view of circle A of FIG. 6.
Figure 8:
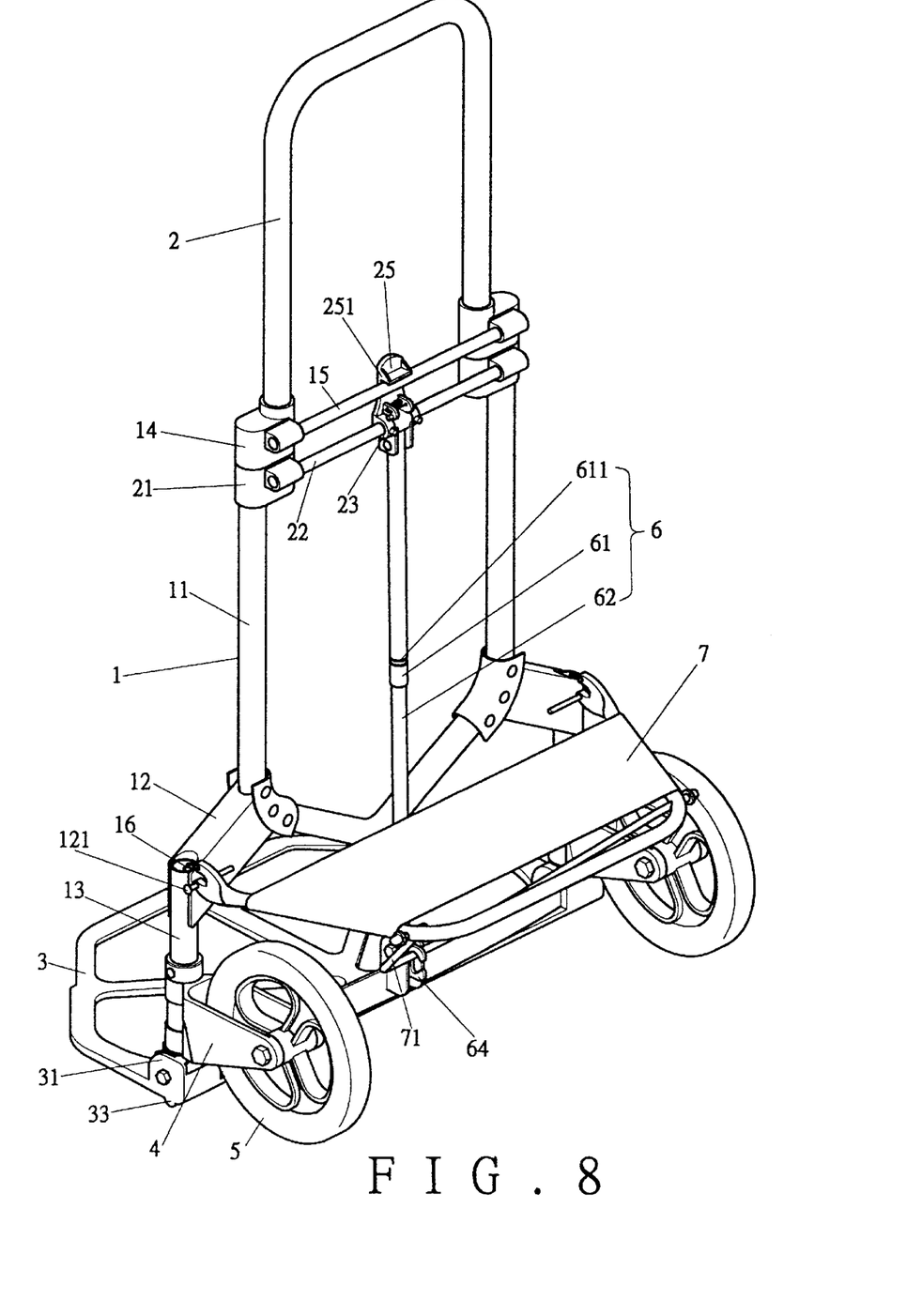
FIG. 8 is a rear perspective view of the present invention in an open status.
Figure 9:
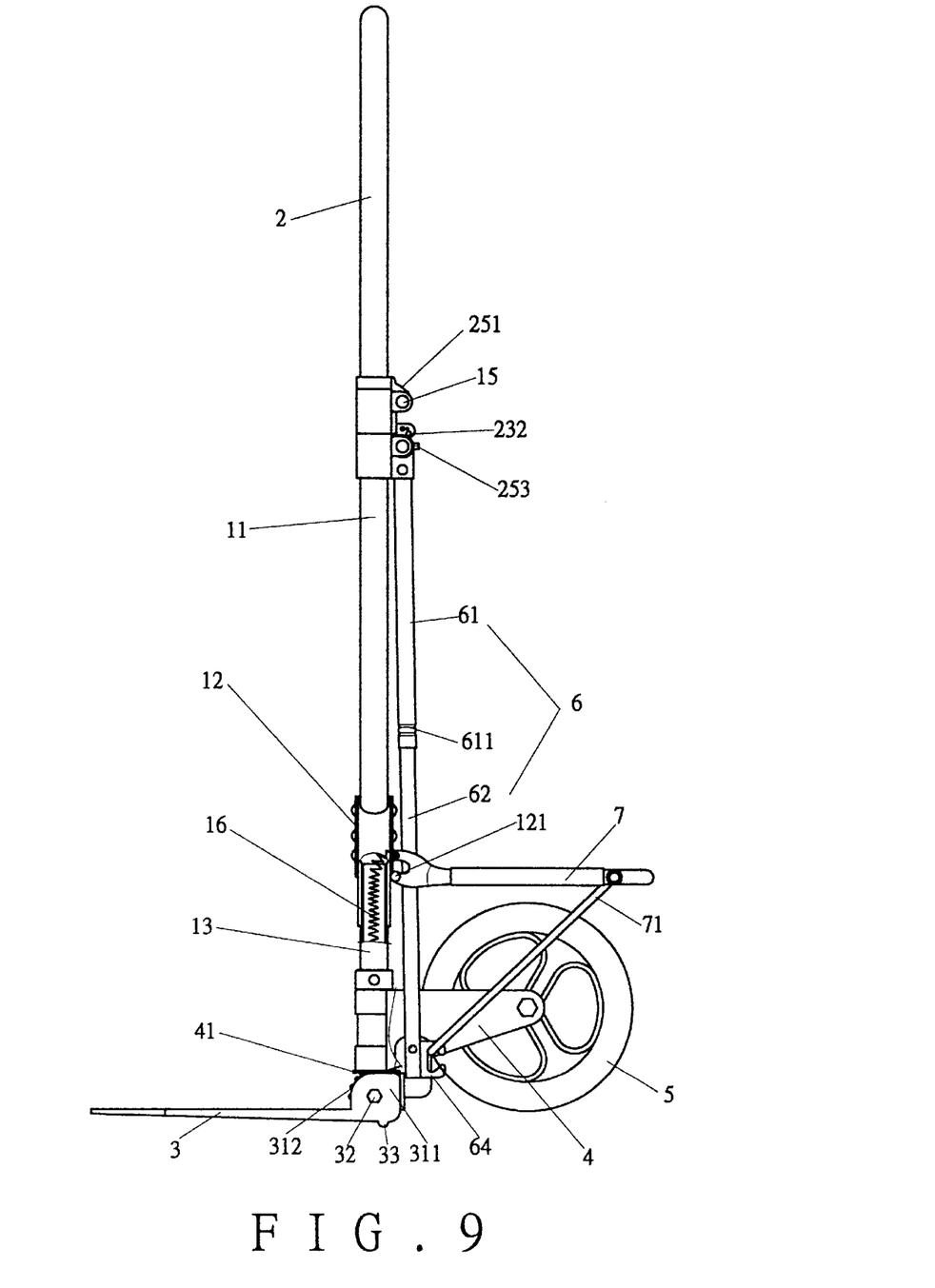
FIG. 9 is a side view of the present invention in an open status.

On the other hand, to expand the cart, by pulling the handle 2 outwardly, the retractable rod 6 will extend too, as shown in FIG. 6. When the outer tube 61 and the inner tube 62 have reached to their extremity, as shown in FIG. 7, the stopper 63 of the inner tube 62 will be stopped by the bulge portion 611, a continuous pulling the handle 2 at this moment, the retractable rod 6 will expand the front support 3 and the meshing of the teeth 312 and 41 will bring the wheel frame 4 to expand too, as shown in FIG. 1. Furthermore, the pulling force of the handle 2 with respect to the main frame 1, the snap plate 25 of the lock 23 will clip the cross bar 22 of the handle 2 that confines the handle 2 from retraction. Still Furthermore, when the rear support 7 is in expand position, as shown in FIGS. 8 and 9, the respective ends pull the pulling spring 16, and the locating bar 71 will be clipped by the C-snap ring 64 of the retractable rod 6 which prevents the rear support 7 from returning to its retractable position.

I claim:

1. A push cart comprising a main frame, a handle, a front support, two wheel frames, two wheels, a retractable rod and a rear support, wherein said main frame having the respective sides connected to respective sides of said handle in a slidable manner, the center portion of said main frame being connected to respective sides of said rear support, the lower portions of said main frame being connected to said wheel frames which then connected to said wheels, respectively, the lower ends of said main frame being connected to respective sides of said front support, Further, the respective sides of said front support comprising teeth, and said wheel frame having teeth corresponding to and meshing with said teeth of said front support, said handle having its respective ends connected to said retractable rod, and the other end of said retractable rod being connected to the inner center portion of said front support, thus, by operating said handle, linking said retractable rod and said front support and said wheel frame to move simultaneously.

2. The push cart as recited in claim 1, wherein said main frame comprising a U-shaped rod, two fixtures secured to the respective lower ends of said U-shaped rod, two supporting rods connected to said fixtures, respectively, two sockets, a cross bar and two pulling springs, each said supporting rod having a torque spring which has one end secured to said supporting rod while the other end of said torque spring being secured to said rear support, each said fixture comprising pin, and said sockets being connected to said U-shaped rod and having a cross bar extending in between.

3. The push cart, as recited in claim 1, wherein said handle shape like a reversed English letter U, comprising two sliding seats, a cross bar, a lock, a torque spring, and a snap plate, wherein two ends of said handle are inserted into sockets and secured with said sliding seats of said main frame respectively, said sliding seats are inserted through respective ends of said U-shaped rod, a cross bar being set between said sliding seats, and a lock being set on said cross bar, said lock being connected to said torque spring and said snap plate, said snap plate having a slope surface.

4. The push cart, as recited in claim 1, wherein said lock having a stopper at top end and said snap plate having a stopper at its lower left and right positions, respectively.

5. The push cart, as recited in claim 1, wherein said front support having a hinge extending from respective ends, and each hinge hinges the lower ends of each said supporting rod, and each hinge having teeth, said wheel frame hinged to the lower end of said supporting rod, and said wheel frame corresponding to said teeth of said rear support having formed with teeth for meshing together.

6. The push cart, as recited in claim 1, wherein said retractable rod comprising an outer tube, an inner tube, a stopper and a C-snap ring, whereas said inner tube being sleeved on said outer tube in an sliding manner, and said inner tube having a stopper at its top end which comprises an outer diameter slightly larger than the outer diameter of said inner tube and smaller than the inner diameter of said outer tube, said stopper comprising a C-shaped groove at its top end and said outer tube having an inner bulge portion, said outer tube having a C-snap rig at the lower end and the lower end of said outer tube being connected to the center portion of said rear support.

* * * * *